United States Patent
Hong et al.

(10) Patent No.: US 11,958,937 B2
(45) Date of Patent: Apr. 16, 2024

(54) POLYMERIZABLE COMPOSITION AND OPTICAL MATERIAL PRODUCED THEREFROM

(71) Applicant: SKC CO., LTD., Gyeonggi-do (KR)

(72) Inventors: Seung Mo Hong, Incheon (KR); Jung Hwan Myung, Gyeonggi-do (KR); Hyuk Hee Han, Gyeonggi-do (KR); Jeongmoo Kim, Gyeonggi-do (KR); Junghwan Shin, Gyeonggi-do (KR)

(73) Assignee: SK PUCORE CO., LTD., Ulsan (KR)

( * ) Notice: Subject to any disclaimer, the term of this patent is extended or adjusted under 35 U.S.C. 154(b) by 635 days.

(21) Appl. No.: 15/734,513

(22) PCT Filed: Jun. 4, 2019

(86) PCT No.: PCT/KR2019/006732
§ 371 (c)(1),
(2) Date: Dec. 2, 2020

(87) PCT Pub. No.: WO2019/235815
PCT Pub. Date: Dec. 12, 2019

(65) Prior Publication Data
US 2021/0230351 A1 Jul. 29, 2021

(30) Foreign Application Priority Data

Jun. 4, 2018 (KR) ........................ 10-2018-0064307

(51) Int. Cl.

| | |
|---|---|
| C08G 18/76 | (2006.01) |
| C08G 18/24 | (2006.01) |
| C08G 18/28 | (2006.01) |
| C08G 18/32 | (2006.01) |
| C08G 18/38 | (2006.01) |
| C08K 5/06 | (2006.01) |
| C08K 5/07 | (2006.01) |
| C08K 5/132 | (2006.01) |
| C08K 5/3475 | (2006.01) |
| C08L 75/04 | (2006.01) |
| G02B 1/04 | (2006.01) |

(52) U.S. Cl.
CPC ....... *C08G 18/7642* (2013.01); *C08G 18/242* (2013.01); *C08G 18/2875* (2013.01); *C08G 18/288* (2013.01); *C08G 18/3215* (2013.01); *C08G 18/3218* (2013.01); *C08G 18/3851* (2013.01); *C08G 18/3855* (2013.01); *C08G 18/3876* (2013.01); *C08K 5/06* (2013.01); *C08K 5/07* (2013.01); *C08K 5/132* (2013.01); *C08K 5/3475* (2013.01); *C08L 75/04* (2013.01); *G02B 1/041* (2013.01)

(58) Field of Classification Search
CPC ............ C08G 18/7642; C08G 18/3855; C08G 18/242; C08G 18/2875; C08G 18/288; C08G 18/3215; C08G 18/3218; C08G 18/3851; C08G 18/3876; G02B 1/041; C08K 5/132; C08K 5/3475; C08K 5/06; C08K 5/07; C08L 75/04
See application file for complete search history.

(56) References Cited

U.S. PATENT DOCUMENTS

| | | | | |
|---|---|---|---|---|
| 5,384,380 A | * | 1/1995 | Kanesaki | .............. G02B 1/041 526/292.9 |
| 2017/0198083 A1 | * | 7/2017 | Kim | ...................... G02B 5/208 |

FOREIGN PATENT DOCUMENTS

| | | |
|---|---|---|
| JP | 10-186291 A | 7/1998 |
| JP | 11-218602 A | 8/1999 |
| JP | 3538332 B2 | 6/2004 |
| JP | 4334633 B2 | 9/2009 |
| JP | 2013-003488 A | 1/2013 |
| KR | 10-2009-0068812 A | 6/2009 |
| KR | 10-2016-0008976 A | 1/2016 |

\* cited by examiner

*Primary Examiner* — Rabon A Sergent
(74) *Attorney, Agent, or Firm* — IP & T GROUP LLP

(57) ABSTRACT

One embodiment relates to a polymerizable composition and an optical material produced therefrom which has excellent lightfastness and minimized color defects, and more specifically, the polymerizable composition according to one embodiment includes UV absorbers having, as the main absorption wavelength, either a long-wavelength region or a short-Wavelength region Within the UV region, wherein the UV absorbers do not absorb in the Visible light region. Accordingly, the polymerizable composition may be used to provide an optical material having excellent lightfastness and minimized color defects.

17 Claims, 1 Drawing Sheet

[Fig. 1]
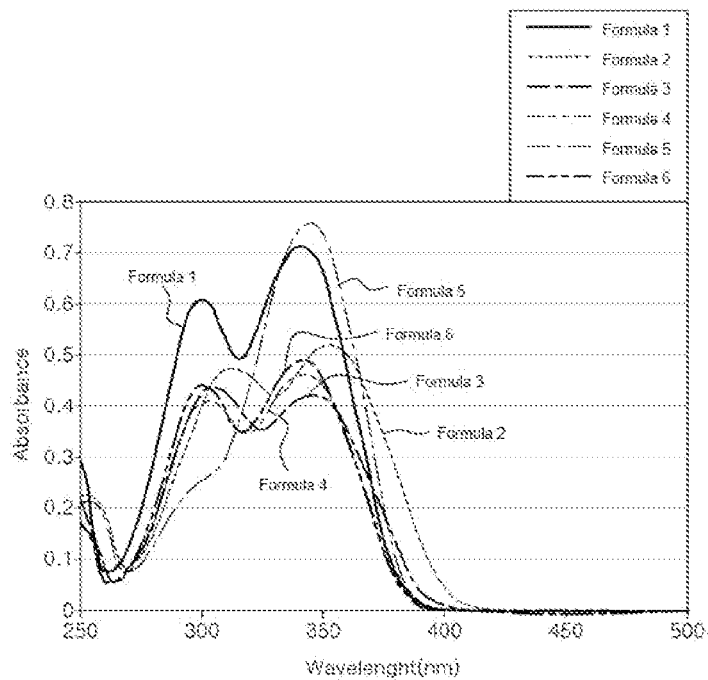
[Fig. 2]
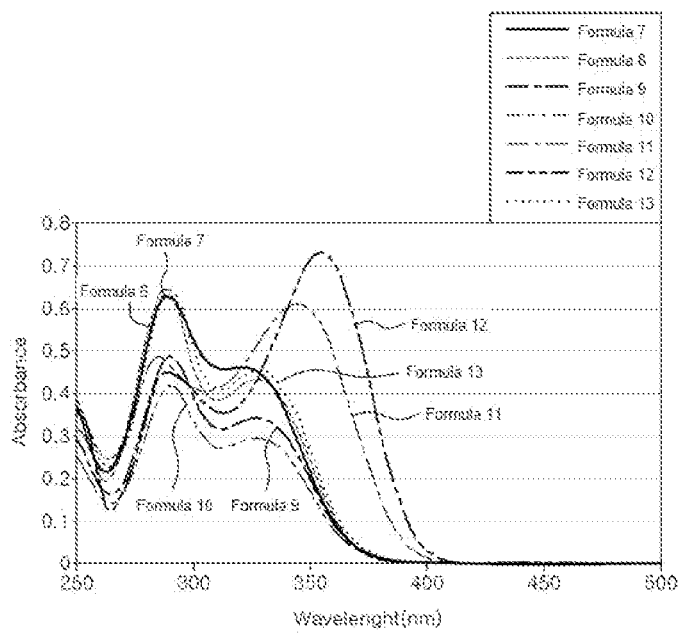

POLYMERIZABLE COMPOSITION AND OPTICAL MATERIAL PRODUCED THEREFROM

This application is a national stage application of PCT/KR2019/006732 filed on Jun. 4, 2019, which claims priorities of Korean patent application number 10-2018-0064307 filed on Jun. 4, 2018. The disclosure of each of the foregoing applications is incorporated herein by reference in its entirety.

TECHNICAL FIELD

Embodiments relate to a polymerizable composition comprising two or more types of an ultraviolet absorber, which having different primary absorption wavelengths from each other, and an optical material prepared therefrom with excellent light resistance and minimized color defects.

BACKGROUND ART

Since optical materials using plastics are lightweight, hardly breakable, and excellent in dyeability as compared with optical materials made of inorganic materials such as glass, they are widely used as optical materials for eyeglass lenses, camera lenses, and the like. Among them, optical materials prepared from a polythiourethane-based polymer obtained by polymerizing a polythiol compound and a polyisocyanate compound are widely used by virtue of their excellent physical properties such as high refractive index, high Abbe's number, and high strength.

However, optical materials using plastics as described above lack light resistance, so that there has been a problem that yellowing readily occurs when they are exposed to sunlight for a long period of time. In order to mitigate this problem, an ultraviolet absorber is added to a polymerizable composition to enhance the light resistance. If an ultraviolet absorber is added, however, the plastic optical material becomes yellow, resulting in a problem from the viewpoint of aesthetics, and it is difficult to secure light resistance in the entire ultraviolet region.

For example, Japanese Patent No. 3538332 discloses a plastic lens formed from a composition for plastic lenses, which comprises an ultraviolet absorber having a maximum absorption wavelength of 345 nm or more.

In addition, Japanese Patent No. 4334633 discloses a polymerization composition for plastic lenses, which comprises a benzotriazole-based ultraviolet absorber having a molecular weight of 360 or less.

DETAILED DESCRIPTION OF THE INVENTION

Technical Problem

However, there is a problem that the lenses disclosed in Japanese Patent Nos. 3538332 and 4334633 still have poor color and poor light resistance.

In order to solve the above problem, the embodiments aim to provide a polymerizable composition for preparing an optical material with excellent light resistance and minimized color defects, an optical material prepared from the polymerizable composition, and a process for preparing the same.

Solution to the Problem

The polymerizable composition according to an embodiment comprises one or more types of a polythiol compound; one or more types of a polyisocyanate compound; one or more types of a first ultraviolet absorber having a primary absorption wavelength ($\lambda_1$) in a wavelength range of 320 nm to 350 nm; and one or more types of a second ultraviolet absorber having a primary absorption wavelength (Q) in a wavelength range of 250 nm to 300 nm.

The optical material according to an embodiment is prepared from the polymerizable composition.

A process for preparing an optical material according to an embodiment comprises injecting the polymerizable composition into a mold and then thermally curing it.

Advantageous Effects of the Invention

The polymerizable composition according to an embodiment comprises both an ultraviolet absorber having a long wavelength range in the ultraviolet region as a primary absorption wavelength and an ultraviolet absorber having a short wavelength range as a primary absorption wavelength, wherein the ultraviolet absorbers do not absorb visible light.

Thus, it is possible to provide an optical material having excellent light resistance and minimized color defects using the polymerizable composition.

BRIEF DESCRIPTION OF THE DRAWINGS

FIG. 1 shows the UV spectra of the compounds represented by Chemical Formulae 1 to 6.

FIG. 2 shows the UV spectra of the compounds represented by Chemical Formulae 7 to 13.

BEST MODE FOR CARRYING OUT THE INVENTION

Glossary of Terms

Unless otherwise stated or defined, all technical and scientific terms used herein have the meanings commonly understood by those skilled in the art to which the present invention pertains.

Unless otherwise stated, all percentages, parts, ratios, and the like are by weight.

Throughout the present specification, when a part is referred to as "comprising" an element, it is understood that other elements may be comprised, rather than other elements are excluded, unless specifically stated otherwise.

All numbers to express the amounts of components, characteristics such as molecular weight, reaction conditions, and the like used herein are to be understood as being modified by the term "about" in all instances.

The terms first, second, and the like are used herein to describe various elements, and the elements should not be limited by the terms. The terms are used only for the purpose of distinguishing one element from another.

In the present specification, "minimizing color defects" means minimizing the phenomenon of color defects caused by yellowing of an optical material when exposed to sunlight, minimizing the phenomenon of color defects that occurs when an optical material becomes yellow when an ultraviolet absorber is added to the polymerizable composition, or both.

In the present specification, the "primary absorption wavelength" is defined as the inflection point at which the differential value changes from (+) to (−) in the graph measured in the absorption (absorbance) mode of an ultraviolet absorber using a UV spectrum. One or more, specifically one or two primary absorption wavelengths, may exist depending on the type of the ultraviolet absorber. The wavelength having the maximum absorption intensity among the "primary absorption wavelengths" is defined as the "maximum absorption wavelength ($\lambda_{max}$)." Each ultraviolet absorber has the most UV blocking effect at the maximum absorption wavelength.

In the present specification, the "total light transmittance" refers to a value obtained by producing a UV spectrum at certain intervals in the thickness direction for a sample of an optical material prepared to have a certain thickness and diameter using a UV-visible spectrophotometer and then calculating the arithmetic average of the transmittances in the visible light region. The thickness, diameter, and intervals for producing the UV spectrum of the sample may be appropriately adjusted.

Hereinafter, the present invention will be described in detail with reference to the embodiments. The embodiments may be modified into various forms as long as the gist of the invention is not altered.

An embodiment provides a polymerizable composition for preparing an optical material with excellent light resistance and minimized color defects, an optical material prepared from the polymerizable composition, and a process for preparing the same.

The polymerizable composition according to an embodiment comprises one or more types of a polythiol compound; one or more types of a polyisocyanate compound; one or more types of a first ultraviolet absorber having a primary absorption wavelength ($\lambda_1$) in a wavelength range of 320 nm to 350 nm; and one or more types of a second ultraviolet absorber having a primary absorption wavelength ($\lambda_{1'}$) in a wavelength range of 250 nm to 300 nm.

Ultraviolet Absorber

The polymerizable composition according to an embodiment comprises one or more types of a first ultraviolet absorber having a primary absorption wavelength ($\lambda_1$) in a wavelength range of 320 nm to 350 nm; and one or more types of a second ultraviolet absorber having a primary absorption wavelength ($\lambda_{1'}$) in a wavelength range of 250 nm to 300 nm.

The first ultraviolet absorber may comprise one or more types of an ultraviolet absorber having a primary absorption wavelength ($\lambda_1$) in a wavelength range of 320 nm to 350 nm. In addition, the first ultraviolet absorber may further have a primary absorption wavelength ($\lambda_2$) in a wavelength range of 290 nm to less than 320 nm. In the first ultraviolet absorber, the primary absorption wavelength ($\lambda_1$) may be the maximum absorption wavelength ($\lambda_{max}$).

Specifically, the primary absorption wavelength ($\lambda_1$) of the first ultraviolet absorber may be present in a wavelength range of 320 nm to 350 nm, 320 nm to 345 nm, or 340 nm to 350 nm. Specifically, the primary absorption wavelength ($\lambda_1$) may be present in a wavelength range of 320 nm to 345 nm or 340 nm to 345 nm, but it is not limited thereto.

In addition, the primary absorption wavelength ($\lambda_2$) of the first ultraviolet absorber may be present in a wavelength range of 290 nm to less than 320 nm or 290 nm to 310 nm. Specifically, the primary absorption wavelength ($\lambda_2$) may be present in a wavelength range of 295 nm to 305 nm, but it is not limited thereto.

The second ultraviolet absorber may comprise one or more types of an ultraviolet absorber having a primary absorption wavelength ($\lambda_{1'}$) in a wavelength range of 250 nm to 300 nm. The second ultraviolet absorber may further have a primary absorption wavelength ($\lambda_{2'}$) in a wavelength range of 320 nm to 350 nm. In the second ultraviolet absorber, the primary absorption wavelength ($\lambda_{1'}$) may be the maximum absorption wavelength ($\lambda_{max}$).

Specifically, the primary absorption wavelength ($\lambda_{1'}$) of the second ultraviolet absorber may be present in a wavelength range of 250 nm to 300 nm. Specifically, the primary absorption wavelength ($\lambda_{1'}$) may be present in a wavelength range of 280 nm to 300 nm. More specifically, the primary absorption wavelength ($\lambda_{1'}$) may be present in a wavelength range of 280 nm to 290 nm, but it is not limited thereto. In addition, the primary absorption wavelength ($\lambda_{2'}$) of the second ultraviolet absorber may be present in a wavelength range of 320 nm to 350 nm. Specifically, the primary absorption wavelength ($\lambda_{2'}$) may be present in a wavelength range of 320 nm to 335 nm. More specifically, the primary absorption wavelength ($\lambda_{2'}$) may be present in a wavelength range of 330 nm to 335 nm, but it is not limited thereto.

Specifically, the first ultraviolet absorber may further have a primary absorption wavelength ($\lambda_2$) in a wavelength range of 290 nm to less than 320 nm, and the second ultraviolet absorber may further have a primary absorption wavelength ($\lambda_{2'}$) in a wavelength range of 320 nm to 350 nm.

The first ultraviolet absorber and the second ultraviolet absorber each may have an absorption rate of 0.01% or less in a wavelength range of 380 nm to 780 nm, which is a wavelength range of visible light. Specifically, the first ultraviolet absorber and the second ultraviolet absorber each may have an absorption rate of 0.001% or less in a wavelength range of 380 nm to 780 nm. More specifically, the first ultraviolet absorber and the second ultraviolet absorber may not absorb a wavelength range of 380 nm to 780 nm. The absorption rate of visible light is obtained from the reflectance measured in the range of 380 nm to 780 nm using an ultraviolet-visible light spectrophotometer (absorption rate (%)=100−reflectance (%)).

The first ultraviolet absorber may be a benzotriazole-based ultraviolet absorber. Specifically, it may be one or a mixture of two or more selected from the group including the compounds represented by the following formulae, but it is not limited thereto.

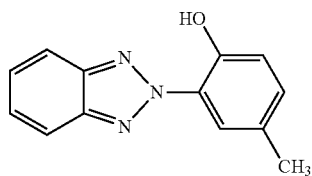 [SMILES: Cc1ccc(O)c(-n2nc3ccccc3n2)c1]

[Formula 1]

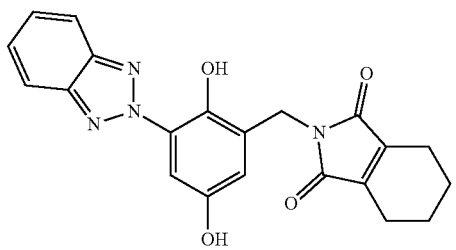

[Formula 4]

-continued

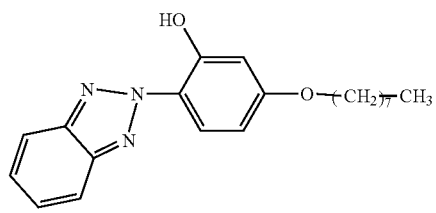
[Formula 5]

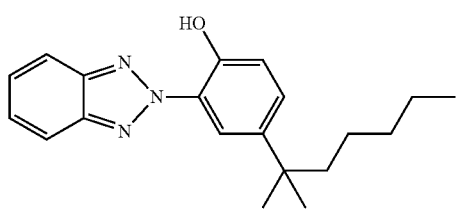 [SMILES: CCCCCC(C)(C)c1ccc(O)c(-n2nc3ccccc3n2)c1]
[Formula 6]

The second ultraviolet absorber may be a benzophenone-based ultraviolet absorber. Specifically, it may be one or a mixture of two or more selected from the group including the compounds represented by the following formulae, but it is not limited thereto.

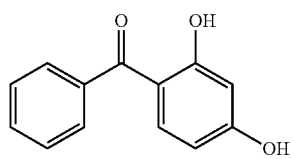 [SMILES: O=C(c1ccccc1)c1ccc(O)cc1O]
[Formula 7]

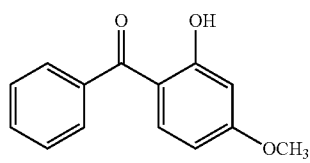 [SMILES: COc1ccc(C(=O)c2ccccc2)c(O)c1]
[Formula 8]

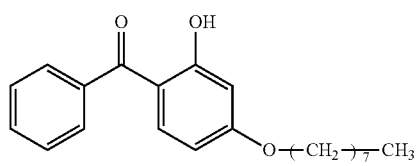
[Formula 9]

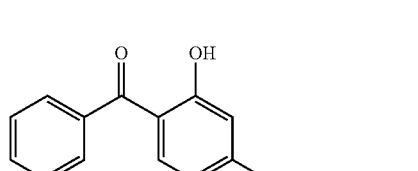
[Formula 10]

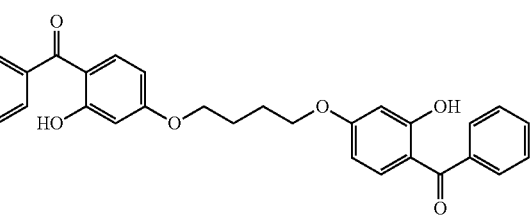
[Formula 13]

Hereinafter, the contents of the first ultraviolet absorber and the second ultraviolet absorber are described.

In addition, the polymerizable composition may comprise 0.001 to 10 parts by weight of the first ultraviolet absorber and the second ultraviolet absorber based on 100 parts by weight of the polythiol compound. Specifically, the polymerizable composition may comprise 0.01 to 5 parts by weight of the first ultraviolet absorber and the second ultraviolet absorber based on 100 parts by weight of the polythiol compound. More specifically, the polymerizable composition may comprise 0.01 to 2 parts by weight of the first ultraviolet absorber and the second ultraviolet absorber based on 100 parts by weight of the polythiol compound, but it is not limited thereto.

In addition, the polymerizable composition may comprise 10 to 1,000 parts by weight of the second ultraviolet absorber based on 100 parts by weight of the first ultraviolet absorber. Specifically, the polymerizable composition may comprise 10 to 500 parts by weight of the second ultraviolet absorber based on 100 parts by weight of the first ultraviolet absorber. More specifically, the polymerizable composition may comprise 10 to 100 parts by weight of the second ultraviolet absorber based on 100 parts by weight of the first ultraviolet absorber. Even more specifically, the polymerizable composition may comprise 10 to 80 parts by weight of the second ultraviolet absorber based on 100 parts by weight of the first ultraviolet absorber. Even more specifically, the polymerizable composition may comprise 20 to 60 parts by weight of the second ultraviolet absorber based on 100 parts by weight of the first ultraviolet absorber, but it is not limited thereto.

The polymerizable composition may comprise one or more types of a polyisocyanate compound and one or more types of a polythiol compound. Specifically, it may comprise one to five types of a polyisocyanate compound and one to five types of a polythiol compound. More specifically, it may comprise one to three types of a polyisocyanate compound and one to four types of a polythiol compound. Even more specifically, it may comprise one to three types of a polyisocyanate compound and one to four types of a polythiol compound. Even more specifically, it may comprise one or two types of a polyisocyanate compound and one or two types of a polythiol compound. In addition, the polymerizable composition may comprise a catalyst.

Polyisocyanate Compound

The polyisocyanate compound may be a conventional one commonly used for the synthesis of polythiourethane. For example, it may comprise at least one selected from the group consisting of an aliphatic isocyanate compound such as isophorone diisocyanate, dicyclohexylmethane-4,4-diisocyanate, hexamethylene diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecatriisocyanate, 1,3,6-hexamethylene triisocyanate, 1,8-diisocyanate-4-isocyanatomethyloctane, bis(isocyanatoethyl)carbonate, and bis(isocyanatoethyl) ether; an alicyclic isocyanate compound such as isophorone diisocyanate, 1,2-bis(isocyanatomethyl)cyclohexane, 1,3-bis(isocyanatomethyl)cyclohexane, 1,4-bis(isocyanatomethyl)cyclohexane, dicyclohexylmethane diisocyanate, cyclohexane diisocyanate, methylcyclohexane diisocyanate, dicyclohexyldimethylmethane isocyanate, 2,2-dimethyldicyclohexylmethane isocyanate, and norbornane diisocyanate; and an aromatic isocyanate compound such as bis(isocyanatomethyl)benzene, bis(isocyanatoethyl)benzene, bis(isocyanatopropyl)benzene, bis(isocyanatobutyl)benzene, bis(isocyanatomethyl)naphthalene, bis(isocyanatomethyl)diphenyl ether, phenylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4-diphenylmethane diisocyanate, 3,3-dimethyldiphenylmethane-4,4-diisocyanate, bibenzyl-4,4-diisocyanate, bis(isocyanatophenyl)ethylene, 3,3-dimethoxybiphenyl-4,4-diisocyanate, hexahydrobenzene diisocyanate, hexahydrodiphenylmethane-4,4-diisocyanate, o-xylene diisocyanate, m-xylene diisocyanate, p-xylene diisocyanate, and toluene diisocyanate; a sulfur-containing aliphatic isocyanate compound such as bis(isocyanatoethyl) sulfide, bis(isocyanatopropyl) sulfide, bis(isocyanatohexyl) sulfide, bis (isocyanatomethyl) sulfone, bis(isocyanatomethyl) disulfide, bis(isocyanatopropyl) disulfide, bis(isocyanatomethylthio)methane, bis(isocyanatoethylthio)methane, bis(isocyanatoethylthio)ethane, bis(isocyanatomethylthio)ethane, and 1,5-diisocyanato-2-isocyanatomethyl-3-thiapentane; a sulfur-containing aromatic isocyanate compound such as diphenyl disulfide-2,4-diisocyanate, diphenyl disulfide-4,4-diisocyanate, 3,3-dimethoxy-4,4-diisocyanatodibenzylthio ether, bis(4-isocyanatomethylbenzene) sulfide, 4,4-methoxybenzenethioethylene glycol-3,3-diisocyanate, diphenyl disulfide-4,4-diisocyanate, 2,2-dimethyldiphenyl disulfide-5,5-diisocyanate, 3,3-dimethyldiphenyl disulfide-5,5-diisocyanate, 3,3-dimethyldiphenyl disulfide-6,6-diisocyanate, 4,4-dimethyldiphenyl disulfide-5,5-diisocyanate, 3,3-dimethoxydiphenyl disulfide-4,4-diisocyanate, and 4,4-dimethoxydiphenyl disulfide-3,3-diisocyanate; and a sulfur-containing heterocyclic isocyanate compound such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl) tetrahydrothiophene, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, and 4,5-bis(isocyanatomethyl)-2-methyl-1,3-dithiolane. Specifically, the polyisocyanate compound may be one to five selected from the group consisting of isophorone diisocyanate, norbornane diisocyanate, m-xylene diisocyanate, toluene diisocyanate, hexamethylene diisocyanate, and cyclohexane diisocyanate.

The NCO content of the polyisocyanate compound may be determined by the method specified in ISO 14896 "Plastics—Polyurethane raw materials—Determination of isocyanate content."

The number of functional groups in the polyisocyanate compound may be 2 or 3.

The weight average molecular weight of the polyisocyanate compound may be 100 g/mole to 900 g/mole or 150 g/mole to 800 g/mole.

Polythiol Compound

The polythiol compound may be a conventional one commonly used for the synthesis of polythiourethane. For example, it may comprise at least one selected from the group consisting of bis(2-(2-mercaptoethylthio)-3-mercaptopropyl) sulfide, 4-mercaptomethyl-1,8-dimercapto-3,6-dithiaoctane, 2,3-bis(2-mercaptoethylthio)propane-1-thiol, 2,2-bis(mercaptomethyl)-1,3-propanedithiol, bis(2-mercaptoethyl) sulfide, tetrakis(mercaptomethyl)methane, 2-(2-mercaptoethylthio)propane-1,3-dithiol, 2-(2,3-bis(2-mercaptoethylthio)propylthio)ethanethiol, bis(2,3-dimercaptopropanyl) sulfide, bis(2,3-dimercaptopropanyl) disulfide, 1,2-bis(2-mercaptoethylthio)-3-mercaptopropane, 1,2-bis(2-(2-mercaptoethylthio)-3-mercaptopropylthio)ethane, 2-(2-mercaptoethylthio)-3-2-mercapto-3-[3-mercapto-2-(2-mercaptoethylthio)-propylthio]propylthio-propane-1-thiol, 2,2-bis-(3-mercapto-propionyloxymethyl)-butyl ester, 2-(2-mercaptoethylthio)-3-(2-(2-[3-mercapto-2-(2-mercaptoethylthio)-propylthio]ethylthio)ethylthio)propane-1-thiol, (4R,11S)-4,11-bis(mercaptomethyl)-3,6,9,12-tetrathiatetradecane-1,14-dithiol, (S)-3-((R-2,3-dimercaptopropyl)thio)propane-1,2-dithiol, (4R,14R)-4,14-bis(mercaptomethyl)-3,6,9,12,15-pentathiaheptane-1,17-dithiol, (S)-3-(R-3-mercapto-2-((2-mercaptoethylthio)propylthio)propylthio)-2-(2-mercaptoethylthio)propane-1-thiol, 3,3'-dithiobis(propane-1,2-dithiol), (7R,11S)-7,11-bis(mercaptomethyl)-3,6,9,12,15-pentathiaheptadecane-1,17-dithiol, (7R,12S)-7,12-bis(mercaptomethyl)-3,6,9,10,13,16-hexathiaoctadecane-1,18-dithiol, 5,7-dimercaptomethyl-1,11-dimercapto-3,6,9-trithiaundecane, 4,7-dimercaptomethyl-1,11-dimercapto-3,6,9-trithiaundecan, 4,8-dimercaptomethyl-1,11-dimercapto-3,6,9-trithiaundecan, pentaerythritol tetrakis(3-mercaptopropionate), trimethylolpropane tris(3-mercaptopropionate), pentaerythritol tetrakis(2-mercaptoacetate), bispentaerythritol-ether-hexakis(3-mercaptopropionate), 1,1,3,3-tetrakis(mercaptomethylthio)propane, 1,1,2,2-tetrakis(mercaptomethylthio)ethane, 4,6-bis(mercaptomethylthio)-1,3-dithiane, 1,4-dithiane-2,5-dimethanthiol, and 2-(2,2-bis(mercaptodimethylthio)ethyl)-1,3-dithiane. Specifically, the polythiol compound may be one to five selected from the group consisting of 4-mercaptomethyl-1,8-dimercapto-3,6-dithiaoctane, 4,8-dimercaptomethyl-1,11-dimercapto-3,6,9-trithiaundecane, pentaerythritol tetrakis(3-mercaptopropionate), pentaerythritol tetrakis(2-mercaptoacetate), and 1,4-dithiane-2,5-dimethanethiol.

The equivalent weight (g/eq.) of the polythiol compound per unit molecular weight may be measured by the capacity titration method using the redox reaction of thiol and iodine.

The number of functional groups in the polythiol compound may be an integer of 2 to 6 or an integer of 2 to 4.

The weight average molecular weight of the polythiol compound may be 100 g/mole to 1,000 g/mole or 200 g/mole to 800 g/mole.

The polymerizable composition may comprise a polythiol compound and an isocyanate compound in a molar ratio of 0.5 to 1.5:1. Specifically, the polymerizable composition may comprise a polythiol compound and an isocyanate compound in a molar ratio of 0.8 to 1.2:1.

Catalyst

The catalyst may be a compound comprising tin. Specifically, the catalyst may be at least one selected from the group consisting of dibutyltin dichloride, dimethyltin dichloride, diethyltin dichloride, dipropyltin dichloride, di-isopropyltin dichloride, and di-tert-butyltin dichloride.

Additive

The polymerizable composition may further comprise such additives as an internal mold release agent, a polymerization initiator, a thermal stabilizer, a blueing agent, a chain extender, a crosslinking agent, a light stabilizer, an antioxidant, and a filler, depending on the purpose thereof.

For example, the internal mold release agent may comprise at least one selected from the group consisting of a fluorine-based nonionic surfactant having a perfluoroalkyl group, a hydroxyalkyl group, or a phosphate ester group; a silicone-based nonionic surfactant having a dimethylpolysiloxane group, a hydroxyalkyl group, or a phosphate ester group; an alkyl quaternary ammonium salt such as trimethylcetylammonium salt, trimethylstearylammonium salt, dimethylethylcetylammonium salt, triethyldodecylammonium salt, trioctylmethylammonium salt, and diethylcyclohexadodecylammonium salt; and an acidic phosphate ester.

The polymerization initiator may include, for example, an amine type, a phosphorus type, an organotin type, an organic copper type, an organic gallium type, an organic zirconium type, an organic iron type, an organic zinc, and an organic aluminum.

The thermal stabilizer may include, for example, a metal fatty acid salt type, a phosphorus type, a lead type, or an organotin type.

The blueing agent has an absorption band in the wavelength range from orange to yellow in the visible light region and has a function of adjusting the color of an optical material made of a resin. Specifically, the blueing agent may comprise a material that exhibits blue to violet color, but it is not particularly limited thereto. In addition, examples of the blueing agent include a dye, a fluorescent whitening agent, a fluorescent pigment, and an inorganic pigment. It may be properly selected in accordance with the properties required for an optical component to be produced and the resin color. The blueing agent may be used alone or in combination of two or more. In view of the solubility in the polymerizable composition and the transparency of the optical material to be produced, a dye is preferably used as the blueing agent. From the viewpoint of the absorption wavelength, the dye may particularly have a maximum absorption wavelength of 520 nm to 600 nm; and more particularly, it may have a maximum absorption wavelength of 540 nm to 580 nm. In addition, in terms of the structure of the compound, an anthraquinone-based dye is preferable as the dye. The method of adding the blueing agent is not particularly limited, and the blueing agent may be added to the monomers in advance. Specifically, various methods can be used; for example, the blueing agent may be dissolved in the monomers or may be contained in a master solution in a high concentration, the master solution being later diluted with the monomers or other additives and then added.

Polythiourethane-Based Polymer

The polymerizable composition comprising the polythiol compound and the polyisocyanate compound is polymerized (and cured) to prepare a polythiourethane-based polymer. The reaction molar ratio of SH groups to NCO groups in the polymerization reaction may be 0.5 to 3.0, particularly 0.6 to 2.0 or 0.8 to 1.3. Within the above range, it is possible to enhance such properties as refractive index and thermal resistance required for an optical material and the balance between them.

Physical Properties of the Polymerizable Composition

The polymerizable composition may have a viscosity of 1,000 cps (centipoise) or more after it stands at 10° C. for 24 hours. Specifically, the polymerizable composition may have a viscosity of 1,000 to 10,000 cps or 1,500 to 10,000 cps after it stands at 10° C. for 24 hours. If the viscosity of the polymerizable composition after it stands at 10° C. for 24 hours is within the above range, it is possible to prevent the problem that the reactivity of the composition is too high, which lowers the workability, or that the reactivity of the composition is too low, which lowers the production yield.

When the polymerizable composition is made into a specimen having a diameter (φ) of 75 mm and a thickness of 10 mm, it may have a generation rate of bubbles of 0% to 10% and a generation rate of striae of 0% to 8%. Specifically, when the polymerizable composition is made into a specimen having a diameter of 75 mm and a thickness of 10 mm, it may have a generation rate of bubbles of 0% to 8% or 0% to 5% and a generation rate of striae of 0% to 7% or 0% to 5%.

The polymerizable composition may have all of the above-described properties at the same time.

The polymerizable composition may be used to prepare an optical material. The specific form and physical properties of the optical material prepared from the polymerizable composition are as described below.

Optical Material

According to an embodiment, there is provided an optical material prepared from the polymerizable composition. Specifically, the optical material may be comprised of a molded article prepared by curing the polymerizable composition. In addition, the optical material may be produced by polymerizing and molding the polymerizable composition.

The optical material according to an embodiment may have a total light transmittance of 88% or more. Specifically, the total light transmittance may be 89% or more. More specifically, the total light transmittance may be 90% or more. The total light transmittance refers to a value obtained by producing a UV spectrum at certain intervals in the thickness direction for a sample prepared to have a certain thickness and diameter using a UV-visible spectrophotometer and then calculating the arithmetic average of the transmittances in the visible light region. The thickness, diameter, and intervals for producing the UV spectrum of the sample may be appropriately adjusted.

The optical material according to an embodiment may have a change in yellow index (ΔY.I.) of greater than 0 to 1.5. Specifically, the change in yellow index (ΔY.I.) may be greater than 0 to 1.0. More specifically, the change in yellow index (ΔY.I.) may be greater than 0 to 0.6. Even more specifically, the change in yellow index (ΔY.I.) may be greater than 0 to 0.5. Even more specifically, the change in yellow index (ΔY.I.) may be 0.1 to 0.6. Even more specifically, the change in yellow index (ΔY.I.) may be 0.2 to 0.5. The change in yellowness (ΔY.I.) may be calculated according to the following Equation 1.

$$\Delta Y.I.=\{(234 \times x+106 \times y+106)/y\}-\{(234 \times x_o+106 \times y_o+106)/y_o\} \quad \text{[Equation 1]}$$

In Equation 1, $x_o$ and $y_o$ are chromaticity coordinates measured before a circular plate of an optical material having a thickness of 5 mm and φ 75 mm is left in ultraviolet light, and x and y are chromaticity coordinates measured after the circular plate of the optical material is left in ultraviolet light for 24 hours.

Specifically, the optical material may have a total light transmittance of 89% or more and a change in yellow index (ΔY.I.) of greater than 0 to 1.5 as calculated according to Equation 1.

The optical material may have a refractive index of 1.55 to 1.75 for a light at 546 nm. Specifically, the refractive index may be 1.55 to 1.70. More specifically, it may be 1.65 to 1.75, but it is not limited thereto.

The optical material may have an Abbe number of 30 to 50. Specifically, the optical material may have an Abbe number of 35 to 48. More specifically, the optical material may have an Abbe number of 40 to 45, but it is not limited thereto.

The optical material may have all of the above-described properties at the same time.

The optical material may be an optical lens. More specifically, the optical material may be a plastic optical lens. In addition, the optical material may have various shapes by changing the mold used in the production thereof. Specifically, the optical material may be in the form of an eyeglass lens, a camera lens, a light emitting diode (LED), or the like.

According to an embodiment, there is provided a process for preparing an optical material from the polymerizable composition. Specifically, the process may comprise injecting the polymerizable composition into a mold and then thermally curing it.

Specifically, the optical material may be comprised of a molded article prepared by thermally curing the polymerizable composition. In addition, the optical material is produced by polymerizing and molding the polymerizable composition (i.e., a polythiol compound, a polyisocyanate compound, and a catalyst).

First, the polymerizable composition is degassed under a reduced pressure and then injected into a mold for molding an optical material. Such degassing and mold injection may be carried out in a temperature range of, for example, 5° C. to 40° C. Specifically, it may be carried out in a temperature range of 5° C. to 20° C. Once the composition is injected into the mold, polymerization is usually carried out by gradually heating the composition from a low temperature to a high temperature. The temperature of the polymerization reaction may be, for example, 5° C. to 200° C., particularly 10° C. to 150° C. In addition, a reaction catalyst, which is conventionally used in the production of polythiourethane, may be employed in order to control the reaction rate. Specific examples of the reaction catalyst are as exemplified above.

Then, the polythiourethane-based optical material is released from the mold.

The optical material may have various shapes by changing the mold used in the production thereof.

The specific form and physical properties of the optical material prepared from the above process are as described below.

MODE FOR CARRYING OUT THE INVENTION

Example

Hereinafter, the present invention is explained in detail with reference to the following examples. But the following Examples are intended to further illustrate the present invention without limiting its scope.

Preparation Example: Preparation of First Ultraviolet Absorbers and Second Ultraviolet Absorbers The first and second ultraviolet absorbers used in the following Examples and the Comparative Examples are shown in Tables 1 and 2 below. The following compounds can be prepared by known methods or are commercially available.

TABLE 1

| | Chemical structure | Substance name | Primary absorption wavelength* | Absorption of visible light region |
|---|---|---|---|---|
| Formula 1 | | 2-(2-hydroxy-5-methylphenyl)-2H-benzotriazole | 300 nm, 340 nm | No absorption |
| Formula 2 | | 2-(3-tert-butyl-2-hydroxy-5-methylphenyl)-5-chloro-2H-benzotriazole | 310 nm, 360 nm | Absorption |
| Formula 3 | | 2-(3,5-di-tert-pentyl-2-hydroxyphenyl)-2H-benzotriazole | 305 nm, 345 nm | Absorption |
| Formula 4 | | 2-(2H-benzotriazole-2-yl)-4-methyl-6-(3,4,5,6-tetrahydrophthalimidylmethyl)phenol | 305 nm, 345 nm | No absorption |

TABLE 1-continued

| | Chemical structure | Substance name | Primary absorption wavelength* | Absorption of visible light region |
|---|---|---|---|---|
| Formula 5 | | 2-(2-hydroxy-4-octyloxyphenyl)-2H-benzotriazole | <u>345 nm</u> | No absorption |
| Formula 6 | | 2-(2-hydroxy-5-tert-octylphenyl)-2H-benzotriazole | 295 nm, <u>340 nm</u> | No absorption |

*The wavelength having the maximum absorption intensity among the primary absorption wavelengths is defined as the maximum absorption wavelength ($\lambda_{max}$) (underscored).

TABLE 2

| | Chemical structure | Substance name | Primary absorption wavelength | Absorption of visible light region |
|---|---|---|---|---|
| Formula 7 | | 2,4-dihydroxybenzophenone | <u>280 nm</u> | No absorption |
| Formula 8 | | 2-hydroxy-4-methoxybenzophenone | 280 nm, <u>330 nm</u> | No absorption |
| Formula 9 | | 2-hydroxy-4-octyloxy benzophenone | 280 nm, <u>330 nm</u> | No absorption |
| Formula 10 | | (4-(dodecyloxy)-2-hydroxyphenyl)(phenyl)methanone | 290 nm, <u>330 nm</u> | No absorption |
| Formula 11 | | 2,2′4,4′-tetrahydroxybenzophenone | 270 nm, <u>360 nm</u> | Absorption |

TABLE 2-continued

| | Chemical structure | Substance name | Primary absorption wavelength | Absorption of visible light region |
|---|---|---|---|---|
| Formula 12 | (structure shown) | 2,2'-dihydroxy-4,4'-dimethoxybenzophenone | 280 nm, <u>370 nm</u> | Absorption |
| Formula 13 | (structure shown) | 1,4-bis(4-benzoyl-3-hydroxyphenoxy)-butane | 280 nm, <u>335 nm</u> | No absorption |

*The wavelength having the maximum absorption intensity among the primary absorption wavelengths is defined as the maximum absorption wavelength ($\lambda_{max}$) (underscored).

In Tables 1 and 2 above, the primary absorption wavelength is defined as the inflection point at which the differential value changes from (+) to (−) in the graph measured in the absorption mode of an ultraviolet absorber dissolved in chloroform using a UV spectrum. Meanwhile, the wavelength having the maximum absorption intensity among the "primary absorption wavelengths" is defined as the "maximum absorption wavelength ($\lambda_{max}$)." The UV spectra of the compounds represented by Formulae 1 to 6 and those of the compounds represented by Formulae 7 to 13 are shown in FIGS. 1 and 2, respectively.

Examples 1 to 4 and Comparative Examples 1 to 8: Preparation of an Optical Lens

A polymerizable composition was prepared by mixing 201.4 parts by weight of a polyisocyanate compound represented by the following Formula 14, 196.1 parts by weight of a polythiol compound represented by the following Formula 15, 0.04 parts by weight of dibutyltin dichloride as a catalyst, 1 part by weight of a release agent (Zelec®, Stefan), and an ultraviolet absorber. The types and contents of the ultraviolet absorber used in the Examples and the Comparative Examples are shown in Table 3 below.

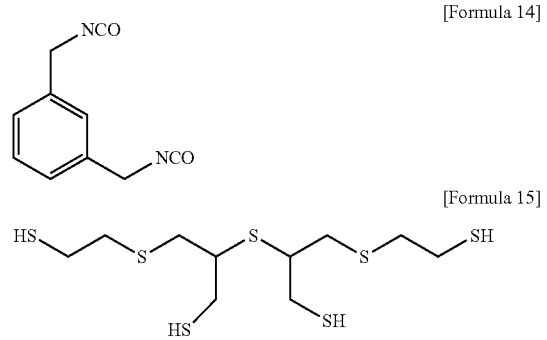

[Formula 14]

[Formula 15]

The polymerizable composition thus prepared was degassed at 10° C. and 2 torr for 1 hour and then filtered through a Teflon filter of 3 μm. The filtered polymerizable composition was injected into a glass mold having a size of 65 cm to 85 cm assembled with a tape. The mold was allowed to stand at 10° C. for 5 hours and heated from 10° C. to 120° C. at a rate of 5° C./min, and then the polymerization was carried out at 120° C. for 18 hours. Then, the resin cured in the glass mold was further cured at 130° C. for 4 hours, and then the molded article was released from the glass mold to obtain an optical lens.

TABLE 3

| | First ultraviolet absorber (amount) | Second ultraviolet absorber (amount) |
|---|---|---|
| Ex. 1 | Compound of Formula 5 (1.5 parts by weight) | Compound of Formula 7 (0.8 part by weight) |
| Ex. 2 | Compound of Formula 1 (2.0 parts by weight) | Compound of Formula 13 (0.5 part by weight) |
| Ex. 3 | Compound of Formula 6 (1.0 part by weight) | Compound of Formula 8 (0.8 part by weight) |
| Ex. 4 | Compound of Formula 4 (0.5 part by weight) | Compound of Formula 9 (0.3 part by weight) |
| C. Ex. 1 | Compound of Formula 5 (2.0 parts by weight) | — |
| C. Ex. 2 | — | Compound of Formula 7 (2.0 parts by weight) |
| C. Ex. 3 | Compound of Formula 2 (2.0 parts by weight) | — |
| C. Ex. 4 | — | Compound of Formula 12 (2.0 parts by weight) |
| C. Ex. 5 | Compound of Formula 2 (1.5 parts by weight) | Compound of Formula 11 (1.4 parts by weight) |
| C. Ex. 6 | Compound of Formula 2 (1.5 parts by weight) | Compound of Formula 12 (1.2 parts by weight) |
| C. Ex. 7 | Compound of Formula 3 (1.5 parts by weight) | Compound of Formula 11 (1.8 parts by weight) |
| C. Ex. 8 | Compound of Formula 3 (1.5 parts by weight) | Compound of Formula 12 (1.6 parts by weight) |

Evaluation Example

The optical materials produced in the Examples and the Comparative Examples were evaluated for the physical properties according to the following methods. The results are shown in Table 4 below.

Evaluation Example 1: Measurement of the Light Resistance of Optical Lenses

The yellow index (Y.I.) of the optical lens was measured using a spectrophotometer (Colormate, Shinko). A circular plate of the optical lens having a thickness of 5 mm and φ 75 mm was prepared for measurement, and the chromaticity coordinates $x_o$ and $y_o$ were measured. Thereafter, the circular plate of the optical lens was measured for chromaticity coordinates x and y after it was left for 24 hours in the QUV equipment of Q-Lab with a UVA 340 lamp mounted. The change in yellow index ($\Delta Y.I.$) was calculated from the measured values of $x_o$, $y_o$, x, and y according to the following Equation 1. The results are shown in Table 4 below.

$$\Delta Y.I.=\{(234 \times x+106 \times y+106)/y\}-\{(234 \times x_o+106 \times y_o+106)/y_o\} \quad \text{[Equation 1]}$$

Evaluation Example 2: Measurement of the Total Light Transmittance of Optical Lenses A sample (optical lens) prepared with a thickness of 5 mm and φ 75 mm was prepared, and a UV spectrum in the thickness direction was obtained at 1 nm intervals using a UV-visible spectrophotometer (Lamda 365 model, Perkin Elmer). Here, the arithmetic average of the transmittances in the visible light region of 380 nm to 780 nm was calculated to obtain the total light transmittance.

TABLE 4

|  | Total light transmittance | Y.I. before exposure to ultraviolet rays | Change in Y.I. before and after exposure to ultraviolet rays ($\Delta Y.I.$) |
| --- | --- | --- | --- |
| Ex. 1 | 89% | 3.8 | 0.3 |
| Ex. 2 | 90% | 3.6 | 0.2 |
| Ex. 3 | 90% | 3.5 | 0.4 |
| Ex. 4 | 90% | 3.6 | 0.5 |
| C. Ex. 1 | 89% | 3.5 | 1.7 |
| C. Ex. 2 | 90% | 3.4 | 2.1 |
| C. Ex. 3 | 87% | 6.9 | 1.6 |
| C. Ex. 4 | 86% | 7.5 | 1.7 |
| C. Ex. 5 | 85% | 6.8 | 1.4 |
| C. Ex. 6 | 86% | 7.1 | 1.9 |
| C. Ex. 7 | 84% | 7.3 | 2.1 |
| C. Ex. 8 | 85% | 8.1 | 1.8 |

As can be seen from Table 4 above, the optical lenses prepared according to Examples 1 to 4 had a high total light transmittance and a small change in Y.I. ($\Delta Y.I.$) before and after the exposure to ultraviolet rays. It was confirmed from these results that the optical lenses prepared according to the Examples had excellent light resistance and no color defects. In contrast, the optical lenses prepared according to Comparative Examples 1 to 8 had a low total light transmittance and a large change in Y.I. ($\Delta Y.I.$) before and after the exposure to ultraviolet rays. It was confirmed from these results that they had poor light resistance and color defects.

The invention claimed is:

1. A polymerizable composition, which comprises:
   at least one polythiol compound;
   at least one polyisocyanate compound; and
   at least two ultraviolet absorbers;
   wherein the at least two ultraviolet absorbers comprise at least one first ultraviolet absorber having a primary absorption wavelength ($\lambda_1$) in a wavelength range of 320 nm to 350 nm; and
   at least one second ultraviolet absorber having a primary absorption wavelength ($\lambda_{1'}$) in a wavelength range of 250 nm to 300 nm,
   wherein the first ultraviolet absorber further has another primary absorption wavelength ($\lambda_2$) in a wavelength range of 290 nm to less than 320 nm, and the second ultraviolet absorber further has another primary absorption wavelength ($\lambda_{2'}$) in a wavelength range of 320 nm to 350 nm.

2. The polymerizable composition of claim 1, wherein the first ultraviolet absorber has a primary absorption wavelength ($\lambda_1$) in a wavelength range of 320 nm to 345 nm.

3. The polymerizable composition of claim 1, wherein, in the first ultraviolet absorber, the primary absorption wavelength ($\lambda_1$) is the maximum absorption wavelength ($\lambda_{max}$).

4. The polymerizable composition of claim 1, wherein, in the second ultraviolet absorber, the primary absorption wavelength ($\lambda_{1'}$) is the maximum absorption wavelength ($\lambda_{max}$).

5. The polymerizable composition of claim 1, wherein the first ultraviolet absorber and the second ultraviolet absorber each have an absorption rate of 0.01% or less in a wavelength range of 380 nm to 780 nm.

6. The polymerizable composition of claim 1, wherein the first ultraviolet absorber comprises one or a mixture of two or more selected from the group consisting of the compounds represented by the following formulae:

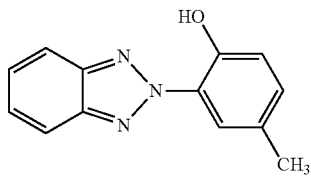
[Formula 1]

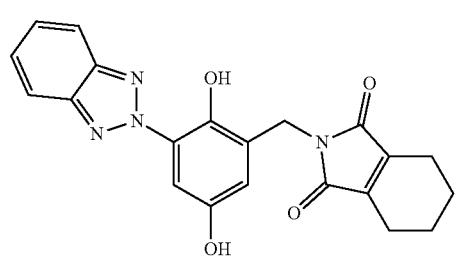
[Formula 4]

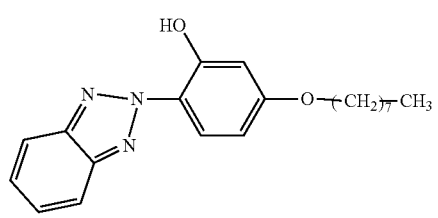
[Formula 5]

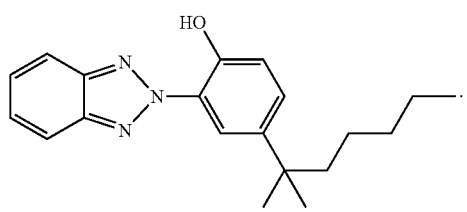
[Formula 6]

7. The polymerizable composition of claim 1, wherein the second ultraviolet absorber comprises one or a mixture of two or more selected from the group consisting of the compounds represented by the following formulae:

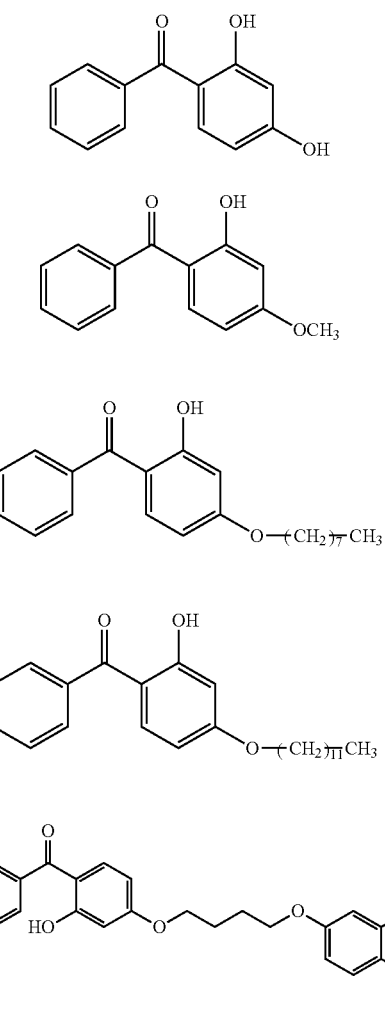

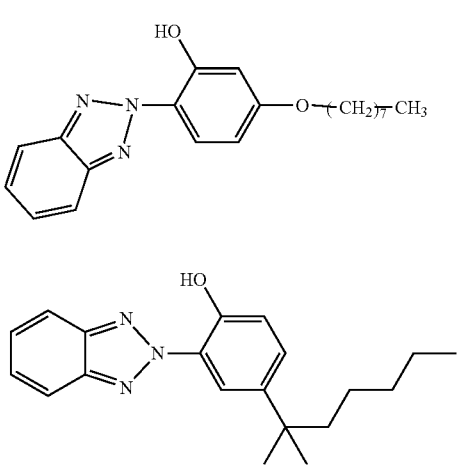

and the second ultraviolet absorber comprises one or a mixture of two or more selected from the group consisting of the compounds represented by the following formulae:

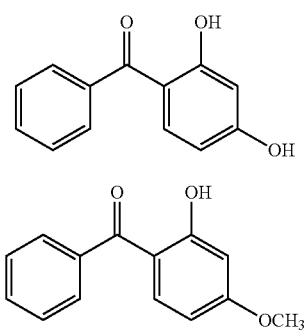

8. The polymerizable composition of claim 1, wherein the first ultraviolet absorber comprises one or a mixture of two or more selected from the group consisting of the compounds represented by the following formulae:

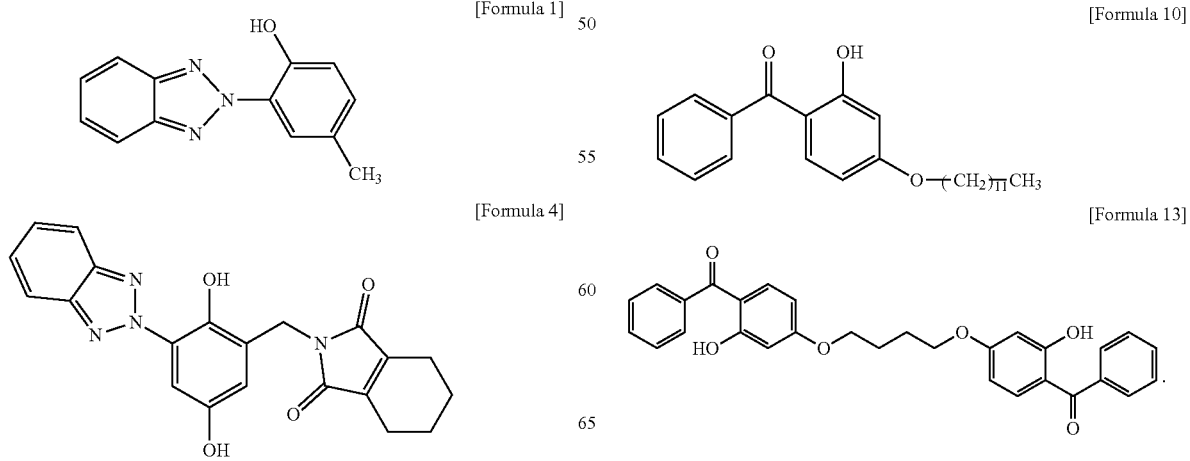

9. The polymerizable composition of claim 1, which is used to prepare an optical material.

10. The polymerizable composition of claim 1, which comprises 0.001 to 10 parts by weight of the first ultraviolet absorber and the second ultraviolet absorber based on 100 parts by weight of the polythiol compound.

11. The polymerizable composition of claim 1, which comprises 10 to 1,000 parts by weight of the second ultraviolet absorber based on 100 parts by weight of the first ultraviolet absorber.

12. An optical material prepared from the polymerizable composition as claimed in claim 1.

13. The optical material of claim 12, which has a total light transmittance of 89% or more.

14. The optical material of claim 12, which has a change in yellow index (ΔY.I.) of greater than 0 to 1.5 as calculated according to the following Equation 1:

$$\Delta Y.I. = \{(234 \times x + 106 \times y + 106)/y\} - \{(234 \times x_o + 106 \times y_o + 106)/y_o\}$$ [Equation 1]

in Equation 1, $x_o$ and $y_o$ are chromaticity coordinates measured before a circular plate of the optical material having a thickness of 5 mm and a diameter of 75 mm is left in ultraviolet light, and x and y are chromaticity coordinates measured after the circular plate of the optical material is left in ultraviolet light for 24 hours.

15. The optical material of claim 14, wherein the change in yellow index (ΔY.I.) is greater than 0 to 1.0.

16. The optical material of claim 12, which has a total light transmittance of 89% or more, and a change in yellow index (ΔY.I.) of greater than 0 to 1.5 as calculated according to the following Equation 1:

$$\Delta Y.I. = \{(234 \times x + 106 \times y + 106)/y\} - \{(234 \times x_o + 106 \times y_o + 106)/y_o\}$$ [Equation 1]

in Equation 1, $x_o$ and $y_o$ are chromaticity coordinates measured before a circular plate of the optical material having a thickness of 5 mm and a diameter of 75 mm is left in ultraviolet light, and x and y are chromaticity coordinates measured after the circular plate of the optical material is left in ultraviolet light for 24 hours.

17. The optical material of claim 12, which is a plastic optical lens.

* * * * *